July 2, 1940.                P. F. BECHBERGER                2,206,018
                              EARTH INDUCTOR COMPASS
                              Filed Dec. 29, 1938
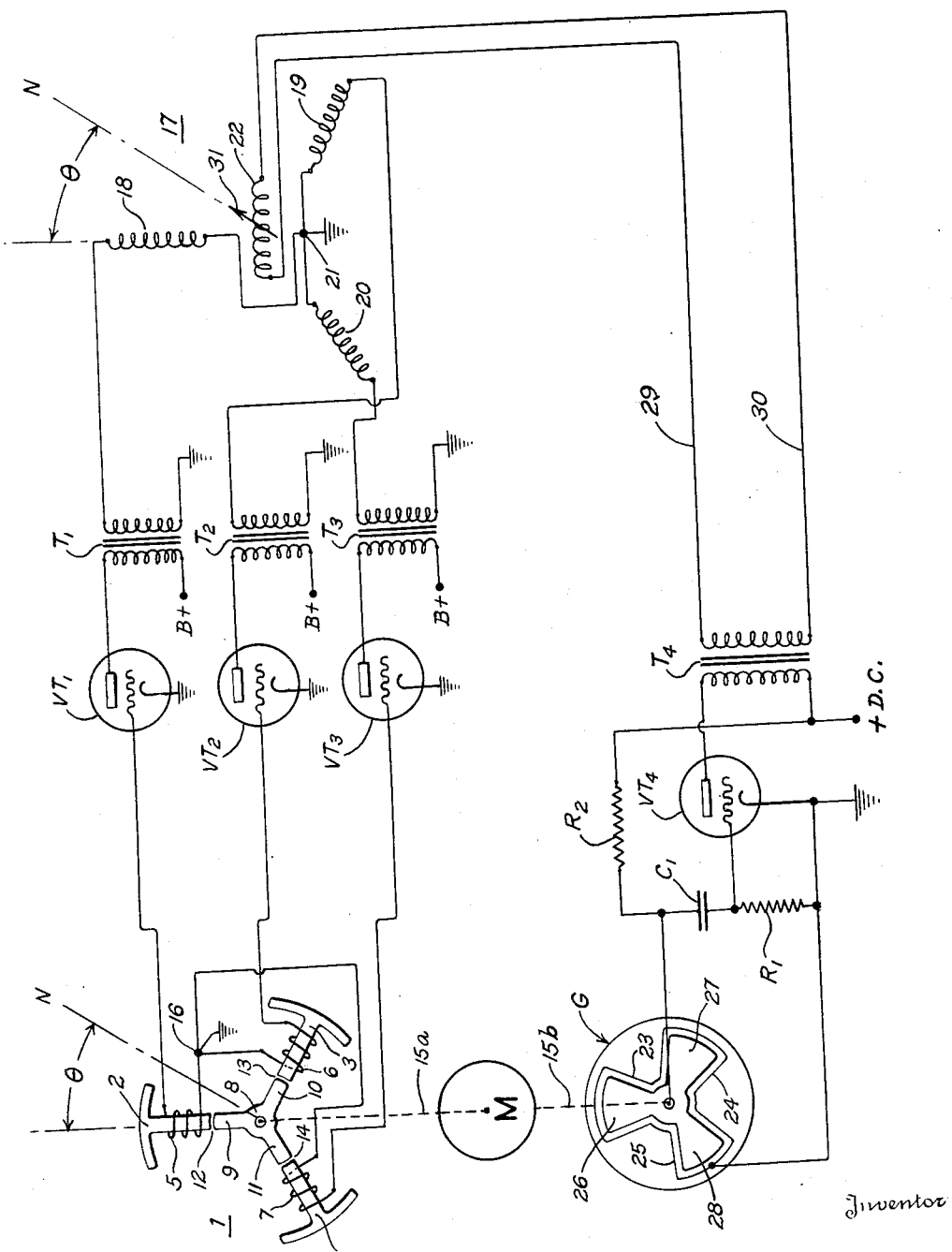
Inventor
P. F. Bechberger.
By Stephen Cerstvik
                    Attorney Patented July 2, 1940

2,206,018

UNITED STATES PATENT OFFICE 2,206,018

EARTH INDUCTOR COMPASS

Paul Franklin Bechberger, Englewood, N. J., assignor to Bendix Aviation Corporation, South Bend, Ind., a corporation of Delaware

REISSUED

Application December 29, 1938, Serial No. 248,335

7 Claims. (Cl. 33—204)

The present invention relates to magnetic compasses and more particularly to earth inductor compasses for remotely indicating the direction of the earth's magnetic field.

One of the objects of the invention is to provide a novel earth inductor compass system which indicates compass direction throughout three hundred sixty degrees (360°) without a follow-up motor or other additional and complicated mechanisms.

Another object is to provide an earth inductor compass system comprising a novel remote compass indicator in combination with a novel earth inductor.

A further object of the invention is to provide a novel earth inductor compass system comprising means including a highly permeable magnetic member having a plurality of pole pieces and provided with a plurality of windings or coils thereon for generating a plurality of alternating current E. M. F.'s from the earth's magnetic field, the amplitudes of said E. M. F.'s being respectively proportional to the cosine of the angle between the magnetic center line of each winding or coil and the direction of the earth's magnetic field, means for generating a single-phase E. M. F. having the same frequency and substantially the same phase as the E. M. F.'s generated from the earth's magnetic field, and means comprising a rotor member and a stator member, one of said members having a plurality of windings connected in polyphase relation and respectively energized by the plurality of E. M. F.'s generated from the earth's magnetic field, and the other of said members having a single-phase winding energized by the single-phase E. M. F. whereby, upon angular displacement of said permeable magnetic member with respect to the earth's field, the rotor member of said last-named means is correspondingly displaced by the reaction between the resultant field produced by the plurality of E. M. F.'s of the polyphase-connected windings and the field of the single-phase winding of the indicating means to assume an angular position corresponding to the direction of the earth's magnetic field.

A still further object of the invention is to provide a novel earth inductor compass system comprising means including a highly permeable magnetic member having three radially extending pole pieces equally spaced angularly and each provided with a winding or coil thereon for generating three alternating current E. M. F.'s from the earth's magnetic field, the amplitudes of said E. M. F.'s being respectively proportional to the cosine of the angle between the magnetic center line of each coil or winding and the direction of the earth's magnetic field, means for generating a local single phase E. M. F. simultaneously with the E. M. F.'s generated from the earth's field and having the same frequency and substantially the same phase as the latter E. M. F.'s, means for amplifying the three E. M. F.'s generated from earth's field, and indicating means connected to said amplifying means and to said single-phase E. M. F. generating means, said indicating means comprising a stator having three windings connected in three-phase relation and respectively energized by the three amplified E. M. F.'s generated from the earth's field, and a rotor having a single-phase winding energized by the single-phase E. M. F. whereby, upon angular displacement of said permeable magnetic member with respect to the earth's magnetic field, the rotor of said indicating means is correspondingly displaced by the reaction between the resultant field produced by the three E. M. F.'s of the three-phase-connected stator windings and the field of the single-phase winding to indicate the direction of the earth's magnetic field.

The above and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only, and is not to be construed as defining the limits of the invention, reference being had for this purpose to the appended claims.

The invention consists substantially in the construction, combination, location and relative arrangement of parts and circuits for obtaining the results desired in accordance with the foregoing objects, as will be more fully hereinafter set forth in the specification, as shown in the drawing by way of example, and as finally pointed out in the claims.

The single figure of the drawing is a schematic circuit diagram of one exemplary arrangement embodying the present invention.

It is well known that the amplitude of an E. M. F. induced in a coil by a magnetic field is proportional to the cosine of the angle between the magnetic center line of the coil and the direction of the magnetic field. Therefore, if an E. M. F. be induced in a coil by the earth's magnetic field, the amplitude of that E. M. F. will be proportional to the cosine of the angle between the magnetic center line of the coil and the direction of the earth's field.

The present invention is based upon the above-stated principle and a plurality of coils, in the present instance three coils connected together in three-phase relation, are provided which are wound on a relatively stationary highly permeable magnetic member having three radially extending pole pieces spaced angularly 120° apart, there being a coil on each pole piece. This magnetic member may be fixed to the craft on which the direction of the earth's field is to be indicated, with the pole pieces lying in a substantially horizontal plane so as not to be affected by the vertical component of the earth's field.

An alternating current E. M. F. is induced in each of the three coils by the earth's magnetic field by periodically varying the earth's magnetic flux in the pole pieces of the permeable member in a manner to be described more fully hereinafter, the amplitudes of said E. M. F.'s being respectively proportional to the cosine of the angle between the magnetic center line of each coil and the direction of the earth's field. A local single-phase alternating current E. M. F. is also generated having the same frequency and substantially the same phase as the three E. M. F.'s. The three E. M. F.'s generated from the earth's magnetic field may then be separately amplified, if desired, by any suitable amplifiers such, for example, as thermionic vacuum tube amplifiers, and are supplied to an indicator. The locally generated single-phase E. M. F. is likewise supplied to the indicator which includes a stator member and a rotor member, one of said members having three windings connected in three-phase relation and respectively energized by the three E. M. F.'s generated from the earth's magnetic field, and the other of said members having a single-phase winding energized by the locally generated single-phase E. M. F. In this manner, when the permeable magnetic member is displaced angularly in azimuth, as when the craft on which the device is mounted makes a turn in azimuth, the three voltages induced in the three coils are amplified and reproduced in the three-phase-connected windings of the indicator and produce a resultant field which reacts with the field produced by the locally generated E. M. F. in the single-phase winding of the indicator, thereby angularly displacing the rotor of the indicator an amount corresponding to the angular displacement of the permeable magnetic member, a pointer being connected to the rotor to indicate the angular displacement thereof and, hence, the direction of the earth's field.

Referring now to the single figure of the drawing, the earth inductor device is shown at 1 and comprises a highly permeable magnetic member constituted, in the present embodiment, by three radially extending pole pieces 2, 3 and 4, angularly equally spaced one hundred twenty degrees (120°) apart. The inductor device 1 is relatively stationary and may be fixed to the craft (not shown) on which the direction of the earth's field is to be indicated, with the pole pieces arranged in a substantially horizontal plane. Wound on the pole pieces 2, 3 and 4 are coils or windings 5, 6 and 7, respectively.

Means are now provided for generating alternating current E. M. F.'s in the coils 5, 6 and 7 respectively, by the earth's magnetic field by periodically varying the earth's magnetic flux in the pole pieces 2, 3 and 4 and, in the form shown, said means comprise a rotor 8 also of highly permeable magnetic material such as permalloy, for example, provided with radial projections or pole pieces 9, 10 and 11 which form air gaps, 12, 13 and 14 with the cooperating inner ends of the pole pieces, 2, 3 and 4, respectively. The rotor member 8 is drivably connected to a suitable driving device such, for example, as an electric motor M for rotation by the latter, as indicated by the dotted line 15a representing a drive shaft. Upon rotation of the rotor 8 the reluctance of the magnetic paths formed by the gaps 12, 13 and 14 is increased and decreased periodically and thus the flux produced in the pole pieces, 2, 3 and 4 by the horizontal component of the earth's field is periodically varied, thereby inducing alternating E. M. F.'s in the coils 5, 6 and 7, respectively. The amplitudes of these E. M. F.'s are respectively proportional to the cosine of the angle between the magnetic center line of each coil and the direction of the earth's field. The angle between the magnetic center line of coil 5 on pole piece 2 and magnetic North is shown at $\theta$.

The coils or windings 5, 6 and 7 are connected in three-phase relation at the junction point 16.

If desired, means may be provided for separately amplifying the E. M. F.'s generated in the coils 5, 6 and 7 and for this purpose there are shown three vacuum tube amplifiers $VT_1$, $VT_2$, and $VT_3$, the inputs of which are respectively connected to the coils 5, 6 and 7, and the outputs of which are connected to the primary windings of transformers $T_1$, $T_2$, and $T_3$, respectively.

In order to indicate the direction of the earth's magnetic field, i. e., to indicate magnetic North, as determined by the E. M. F.'s generated in the coils 5, 6 and 7 of the earth inductor device 1, an indicator is provided which is shown at 17 and which comprises, as shown, an inductive device of the so-called "Selsyn" or "Autosyn" type, including a stator having three windings 18, 19 and 20 connected in three-phase relation at the junction 21, and a rotor having a single-phase winding 22 and an indicating pointer 31. The single-phase winding 22 is arranged in inductive relation with the three-phase-connected windings 18, 19 and 20.

The three amplified E. M. F.'s generated by the earth's magnetic field are supplied respectively to the individual three-phase-connected windings 18, 19 and 20 and for this purpose said windings are connected to the secondary windings of the transformers $T_1$, $T_2$, and $T_3$, respectively.

The single-phase winding 22 is energized by a single-phase alternating current which is generated locally and simultaneously with the three E. M. F.'s generated in the coils 5, 6 and 7 from the earth's magnetic field, said locally generated alternating current having the same frequency and substantially the same phase as the three E. M. F.'s generated from the earth's magnetic field.

Any suitable generator G may be used for generating the single-phase alternating current for supplying the rotor winding 22 of the indicator 17, but the one shown in the present embodiment is of the type described and claimed in the co-pending application of A. A. Stuart, Jr., Serial No. 248,344, filed Dec. 29, 1938.

As shown, said generator G comprises a variable electrostatic condenser having a stationary plate provided with radially extending portions 23, 24 and 25, and a rotatable plate provided with radially extending portions 26, 27 and 28. The rotatable plate is drivably connected to the electric motor M as indicated by the dotted line 15b and, therefore, is rotated at the same speed as the rotor 8 of the earth inductor device 1.

The variable condenser is connected to the input of a thermionic vacuum tube $VT_4$ through a fixed condenser $C_1$ and across a resistor $R_1$, and the output of the vacuum tube VT₄ is connected to the single-phase winding 22 through a transformer T₄.

A D. C. charging potential is impressed on the variable condenser through a resistor R₃, and the potential across said resistor R₃ is periodically increased and decreased by rotation of the rotatable portions 26, 27 and 28 of the condenser G by the electric motor M. This varying potential is amplified by the vacuum tube VT₄, thereby producing a single-phase alternating current in the output of the transformer T₄, which current is supplied to the single-phase rotor winding 22 of the remote indicator 17 by leads 29 and 30, the frequency of said current depending upon the speed of rotation of the rotatable portions of the condenser G and being the same as the frequency of the alternating currents induced in windings 5, 6 and 7 because the same motor M rotates element 8 as well as condenser G. The phase of these currents is likewise substantially the same.

The resultant field produced by the amplified E. M. F.'s in the three-phase-connected windings 18, 19 and 20 is such that the reaction therewith the field of the single-phase rotor winding 22 causes the latter to align itself according to the direction of the earth's field as determined by the windings 5, 6 and 7 of the earth inductor 1, and this direction is indicated by the pointer 31 which is attached to the rotor 22.

There is thus provided a novel earth inductor compass comprising a novel earth indicator and a novel indicator, whereby the compass direction can be indicated throughout three hundred sixty degrees (360°) and without a follow-up motor or other additional and complicated mechanisms, thereby providing a relatively light-weight compass particularly adapted for use on aircraft.

While only one embodiment of the invention has been illustrated and described, various changes in form, construction and relative arrangement of parts, which will now appear to those skilled in the art, may be made without departing from the scope of the invention. Reference is therefore to be had to the appended claims for a definition of the limits of the invention.

What is claimed is:

1. An earth inductor compass comprising, in combination, means including a permeable magnetic member having a plurality of pole pieces and provided with a plurality of windings thereon for generating a plurality of alternating E. M. F.'s from the horizontal component of the earth's magnetic field, the amplitudes of said E. M. F.'s being respectively proportional to the cosine of the angle between the magnetic center line of each winding and the direction of the earth's field, means for locally generating a single-phase alternating E. M. F. simultaneously with the E. M. F.'s generated from the earth's field and having the same frequency and substantially the same phase as the latter E. M. F.'s, and means comprising a rotor member and a stator member, one of said members having a plurality of windings, connected in polyphase relations and respectively energized by the E. M. F.'s generated from the earth's field in the first-named windings and the other of said members having a single-phase winding energized by the locally generated single-phase E. M. F. whereby, upon angular displacement of said permeable magnetic member with respect to the earth's field, the rotor member of said last-named means is correspondingly displaced by the reaction between the resultant field produced by the plurality of E. M. F.'s of the polyphase-connected windings and the field of the single-phase winding of the indicating means to assume an angular position corresponding to the direction of the earth's magnetic field.

2. An earth inductor compass comprising, in combination, means including a highly permeable magnetic member having three radially extending pole pieces equally spaced angularly and each provided with a winding thereon for generating three alternating E. M. F.'s from the earth's magnetic field, the amplitudes of said E. M. F.'s being respectively proportional to the cosine of the angle between the magnetic center line of each winding and the direction of the earth's field, means for locally generating a single-phase alternating E. M. F. simultaneously with the three E. M. F.'s generated from the earth's field and having the same frequency and substantially the same phase as the latter E. M. F.'s, means for amplifying the three E. M. F.'s generated from the earth's field, and indicating means connected to said amplifying means and said single-phase E. M. F. generating means, said indicating means comprising a stator having three windings thereon connected in three-phase relation and respectively energized by the three E. M. F.'s generated from the earth's field in the first-named windings, and a rotor having a single-phase winding thereon energized by the locally generated single phase E. M. F. whereby, upon angular displacement of said permeable magnetic member with respect to the earth's field, the rotor of said indicating means is correspondingly displaced by the reaction between the resultant field produced by the three E. M. F.'s of the three-phase-connected stator windings and the field of the single-phase winding to indicate the direction of the earth's magnetic field.

3. An earth inductor compass comprising, in combination, means including a permeable magnetic member having a plurality of pole pieces equally spaced angularly and provided with a plurality of windings thereon for generating a plurality of alternating E. M. F.'s from the earth's magnetic field, the amplitudes of said E. M. F.'s being respectively proportional to the cosine of the angle between the magnetic center line of each winding and the direction of the earth's field, means for locally generating a single-phase alternating E. M. F. simultaneously with the E. M. F.'s generated from the earth's field and having the same frequency and substantially the same phase as the latter E. M. F.'s, means for amplifying the plurality of E. M. F.'s generated from the earth's field in the first-named windings, and indicating means connected to said amplifying means and said single-phase E. M. F. generating means, said indicating means comprising a stator having three windings thereon connected in three-phase relation and respectively energized by the three E. M. F.'s generated from the earth's field in the first-named windings, and a rotor having a single-phase winding thereon inductively positioned with respect to said three windings, said single-phase winding being energized by the locally generated single-phase E. M. F. whereby, upon angular displacement of said permeable magnetic member with respect to the earth's field, the rotor of said indicating means is correspondingly displaced by the reaction between the resultant field produced by the three E. M. F.'s of the three-phase-connected stator windings and the field of the single-phase winding to indicate the direction of the earth's magnetic field.

4. An earth inductor compass comprising, in combination, means including a permeable magnetic stator member having a plurality of pole pieces and provided with a plurality of windings thereon, a highly permeable magnetic rotor member associated with said stator member, means for rotating said rotor member for varying the flux due to the horizontal component of the earth's magnetic field in said pole pieces to generate a plurality of alternating E. M. F.'s in the windings of said stator member, the amplitudes of said E. M. F.'s being respectively proportional to the cosine of the angle between the magnetic center line of each winding and the direction of the earth's magnetic field, means for locally generating a single-phase alternating E. M. F. simultaneously with the E. M. F.'s generated from the earth's field and having the same frequency and substantially the same phase as the latter E. M. F.'s, and means comprising a rotor member and a stator member, one of said members having a plurality of windings, connected in polyphase relation and respectively energized by the E. M. F.'s generated from the earth's field in the first-named stator member, and the other of said members having a single-phase winding energized by the locally generated single-phase E. M. F. whereby, upon angular displacement of said permeable magnetic member with respect to the earth's field, the rotor member of said last-named means is correspondingly displaced by the reaction between the resultant field produced by the plurality of E. M. F.'s of the polyphase-connected windings, and the field of the single-phase winding of the indicating means to assume an angular position corresponding to the direction of the earth's magnetic field.

5. An earth inductor compass comprising, in combination, means including a highly permeable magnetic stator member having three radially extending pole pieces equally spaced angularly and each provided with a winding thereon, a highly permeable magnetic rotor member associated with said stator member, means for driving said rotor member for varying the horizontal component of the flux due to the earth's magnetic field in said pole pieces to generate three alternating E. M. F.'s in the windings of said stator member, the amplitudes of said E. M. F.'s being respectively proportional to the cosine of the angle between each pole piece and the direction of the earth's magnetic field, means simultaneously driven by the rotor driving means for locally generating a single-phase alternating E. M. F. simultaneously with the three E. M. F.'s generated from the earth's field and having the same frequency and substantially the same phase as the latter E. M. F.'s, means for amplifying the three E. M. F.'s generated from the earth's field in the first-named windings, and indicating means connected to said amplifying means and said single-phase E. M. F. generating means, said indicating means comprising a stator having three windings thereon connected in a three-phase relation and respectively energized by the three E. M. F.'s generated from the earth's field in the first-named windings, and a rotor having a single-phase winding thereon energized by the locally generated single-phase E. M. F. whereby, upon angular displacement of said permeable magnetic member with respect to the earth's field, the rotor of said indicating means is correspondingly displaced by the reaction between the resultant field produced by the three E. M. F.'s of the three-phase-connected stator windings and the field of the single-phase winding to indicate the direction of the earth's magnetic field.

6. An earth inductor compass comprising, in combination, means including a relatively stationary permeable magnetic member having a plurality of pole pieces and provided with a plurality of windings thereon for generating a plurality of alternating E. M. F.'s from the horizontal component of the earth's magnetic field, the amplitudes of said E. M. F.'s being respectively proportional to the cosine of the angle between the magnetic center line of each winding and the direction of the earth's field, means for locally generating a single-phase alternating E. M. F. simultaneously with the E. M. F.'s generated from the earth's field and having the same frequency and substantially the same phase as the latter E. M. F.'s and means comprising a rotor member and a stator member, one of said members having a plurality of angularly spaced windings, connected in polyphase relation and respectively energized by the E. M. F.'s generated from the earth's field in the first-named windings, and the other of said members having a single-phase winding energized by the locally generated single-phase E. M. F. whereby, upon angular displacement of said permeable magnetic member with respect to the earth's field, the rotor member of said last-named means is correspondingly displaced by the reaction between the resultant field produced by the plurality of E. M. F.'s of the polyphase-connected windings and the field of the single-phase winding of the indicating means to assume an angular position corresponding to the direction of the earth's magnetic field.

7. An earth inductor compass comprising, in combination, means including a permeable magnetic member having a plurality of pole pieces and provided with a plurality of windings thereon for generating a plurality of alternating E. M. F.'s from the horizontal component of the earth's magnetic field, the amplitude of said E. M. F.'s being respectively proportional to the cosine of the angle between the magnetic center line of each winding and the direction of the earth's field, means for generating a single-phase alternating E. M. F. having the same frequency and substantially the same phase as the E. M. F.'s generated from the earth's field, and means comprising a rotor member and a stator member, one of said members having a plurality of windings associated therewith and connected in polyphase relation and respectively energized by the E. M. F.'s generated from the earth's field in the first-named winding, and the other of said members having a single-phase winding associated therewith and energized by the single-phase E. M. F. whereby, upon angular displacement of said permeable magnetic member with respect to the earth's field, the rotor member of said last-named means is correspondingly displaced to assume an angular position corresponding to the direction of the earth's magnetic field.

PAUL FRANKLIN BECHBERGER.